Patented Aug. 26, 1930

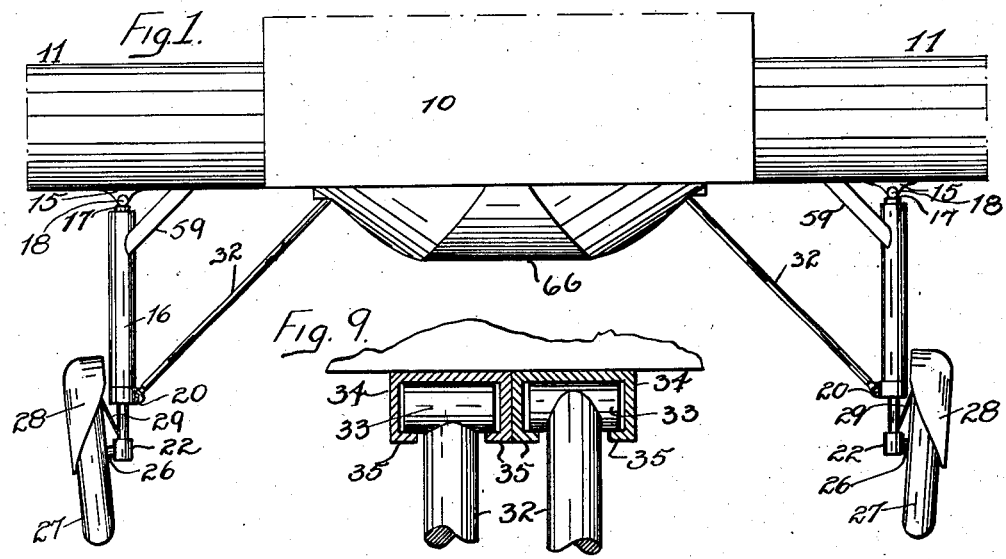
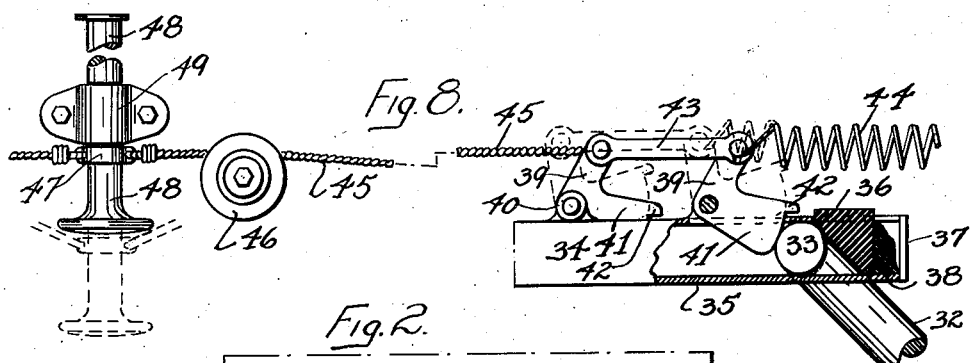
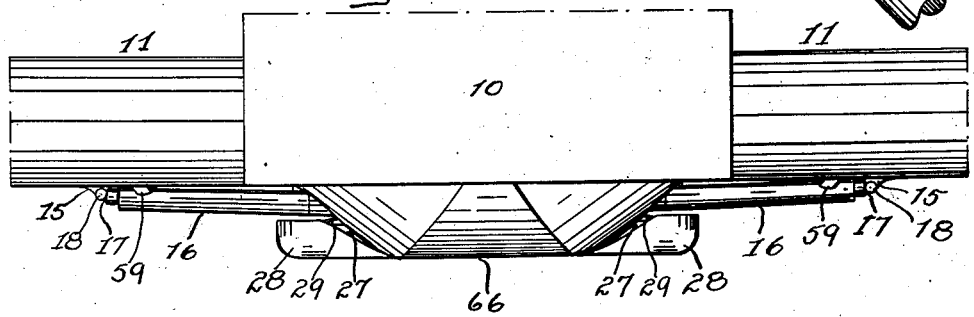

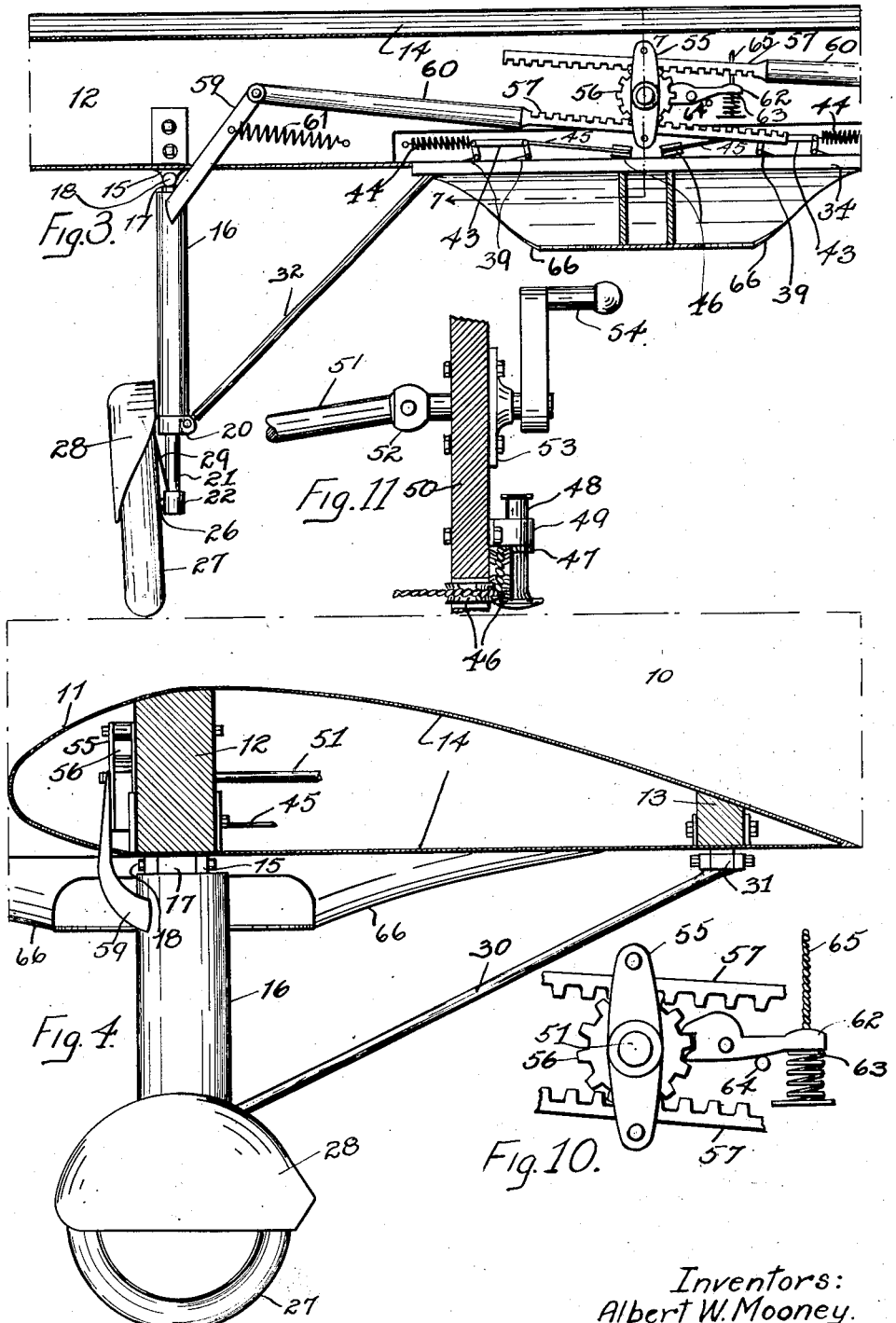

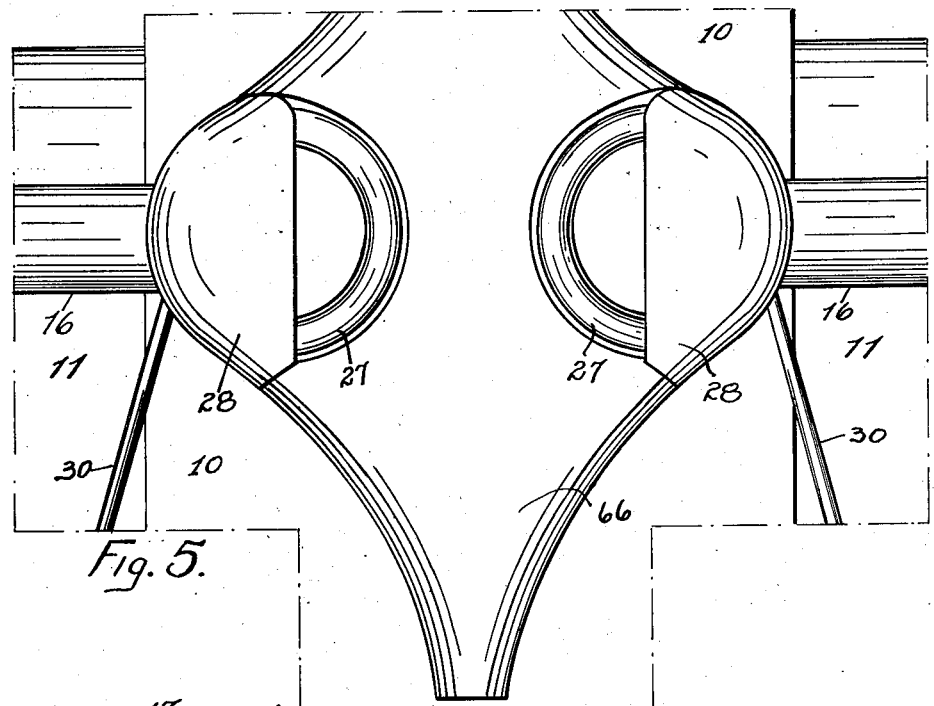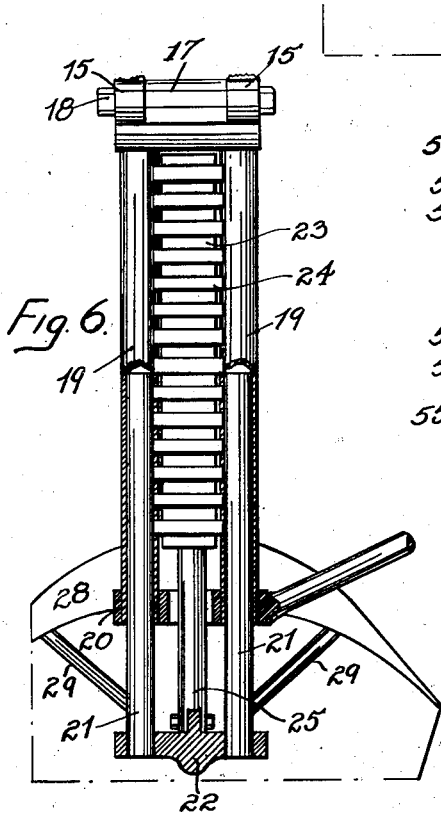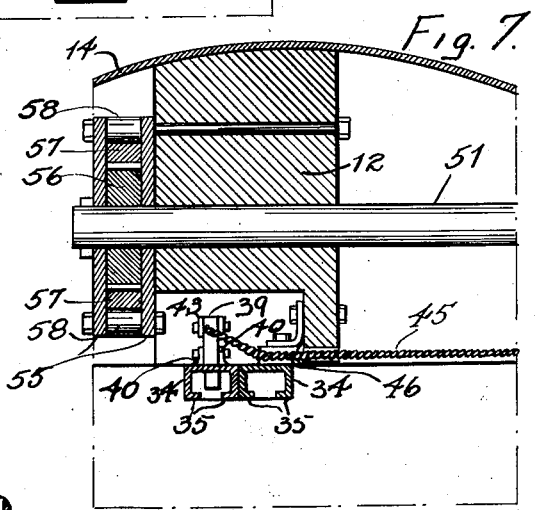

1,774,032

UNITED STATES PATENT OFFICE

ALBERT W. MOONEY AND LEWIS H. HEIGHT, OF COLORADO SPRINGS, COLORADO, ASSIGNORS TO ALEXANDER INDUSTRIES, INC., OF COLORADO SPRINGS, COLORADO, A CORPORATION OF COLORADO

RETRACTABLE LANDING GEAR FOR AIRCRAFT

Application filed February 4, 1929. Serial No. 337,303.

An object of this invention is to provide an improved retractable landing gear for aircraft of the heavier-than-air, land type.

A further object of the invention is to provide an improved foldable landing gear for aircraft of the heavier-than-air, land type.

A further object of the invention is to provide an improved landing gear for aircraft of the heavier-than-air, land type, which gear may be folded into retracted position against or within said aircraft during flight.

A further object of the invention is to provide an improved landing gear for aircraft of the heavier-than-air type, which gear may be folded into retracted position against or within said aircraft to minimize parasite resistance affecting said craft in flight.

A further object of the invention is to provide improved manually-operable means in combination with a foldable landing gear for aircraft of the heavier-than-air type, whereby said gear may be folded into retracted position against or within said craft in flight.

A further object of the invention is to provide an improved foldable landing gear for aircraft of the heavier-than-air type, said gear including locking means whereby said gear is positively locked against accidental displacement when in extended or landing position.

A further object of the invention is to provide improved means in combination with a foldable landing gear for aircraft of the heavier-than-air type, whereby said gear may be quickly extended from folded to landing position and automatically locked in said latter position.

A further object of the invention is to provide improved means in combination with a foldable landing gear for aircraft of the heavier-than-air type whereby said gear may be automatically locked in folded position when retracted against or within said craft.

Our invention consists in the construction, arrangement and combination of elements hereinafter described, pointed out in our claims and illustrated by the accompanying drawings, in which—

Figure 1 is a front elevation of the central portion of a conventionalized aircraft of the heavier-than-air, land type equipped with our improved retractable landing gear shown in extended or landing position. Figure 2 is a front elevation similar to Figure 1 showing the improved retractable landing gear in folded or retracted position. Figure 3 is a fragmentary, vertical, detail section, on an enlarged scale, transversely of the craft and forward of the main spar of the lower wings of said craft. Figure 4 is a fragmentary, vertical, detail section, on the same scale as Figure 3, transversely of one of the wings of the aircraft. Figure 5 is a fragmentary, bottom plan view, on the same scale as Figure 3, of the central portion of the conventionalized aircraft, showing the wheeled ends of the improved landing gear in retracted position. Figure 6 is a fragmentary, vertical, detail section, on a further enlarged scale, showing the construction of one of the hinged landing gear struts. Figure 7 is a fragmentary, vertical, detail section, on a further enlarged scale, on the indicated line 7—7 of Figure 3. Figure 8 is a fragmentary, detail view, partly in section and on an enlarged scale, of the locking and lock-tripping devices employed with the improvement. Figure 9 is a detail cross section, on an enlarged scale, through slide bearings employed in the improvement to receive the ends of certain brace members. Figure 10 is a fragmentary, detail elevation of a portion of the manually-operable retracting mechanism employed in the improvement. Figure 11 is a fragmentary, detail view, partly in section, showing a conventionalized installation of the controls for operating the improved landing gear.

It is a well recognized aerodynamic fact that parasite resistance is one of the most important factors adversely affecting the speed and efficiency of a heavier-than-air craft in flight, and that whenever the parasite resistance of such a craft can be reduced, proportionately enhanced speed and efficiency of operation may be had. Various elements of the craft contribute to the total of parasite resistance, the conventional, rigid landing gear being a very material factor in this regard, and it has been conclusively established that proper folding or retracting of the landing gear while the craft is in flight results in materially increased speed of flight, reduced fuel consumption and improved operating efficiency.

Since heavier-than-air craft vary widely in type and design and our improved retractable landing gear is readily adaptable to practically all of the land type of heavier-than-air craft, including biplanes, high or low wing monoplanes and open or closed craft, the illustrative showing of the invention has been limited to a very conventional, diagrammatic representation of the structural elements of the craft itself with complete omission of power plant, propeller and other detail not essential to the invention.

In the construction of our improvement as shown, the numeral 10 designates the fuselage or body portion of a heavier-than-air craft, which may be of any type desired, aerofoils or wings 11, comprising spaced, parallel, longitudinal spars 12, 13 suitably braced and enclosed in a streamlined envelope 14, being secured to and extending laterally from each side of said fuselage in a conventional manner. The spars 12 and 13 may be continuous through the fuselage 10, as illustrated, or may be interrupted by said fuselage, the type of aircraft controlling such details of construction, and the wings 11 shown in the drawings may be the sole lifting surfaces of the craft, as in the case of a low-wing monoplane, or may be the lower wings of a biplane, all such details being unimportant to the construction and operation of the improved landing gear hereinafter described.

The improved landing gear, or carriage, comprises independent, counterpart halves operable by a common mechanism, one only of said halves being particularly described. A hinge-half 15 is suitably secured to the beam 12, or other rigid structural element of the craft, with its knuckle portion depending below said beam and a resilient strut assembly 16 is formed with a hinge-half 17 on its upper end adapted to register with the hinge-half 15, said halves being connected by a pintle 18 axially parallel with the longitudinal median line of the craft, thus hingedly suspending the strut assembly 16 from and beneath the craft in a substantially vertical position and free to swing laterally of said craft. The resilient strut assembly 16 may be of any suitable construction and is illustrated as comprising a rigid upper portion consisting of spaced, parallel tubes or cylinders 19 connected at their upper ends by the hinge-half 17 and at their lower ends by a yoke or cross member 20, the bores of the tubes 19 opening downwardly through said latter member. Spaced, parallel cylinders 21 are mounted for vertical reciprocation within the tubes 19 and project therebelow, said cylinders 21 being rigidly secured to and connected at their lower ends by a cross member 22. A resilient element is conventionally illustrated as comprising a hydraulic cylinder and piston arrangement 23 in combination with units 24 of resilient material, such an element being common and well known and in itself forming no part of the novelty of this invention, the cylinder 23 and blocks 24 being suitably connected with the assembly of tubes 19 and the piston or movable unit of the resilient element being connected by means of a rod 25 with the cross member 22 carrying the cylinders 21, in such manner as to transfer relative movement between the tubes 19 and cylinders 21 to the resilient element, whereby said relative movement may be limited and controlled. The resilient or shock-absorbing element above described is illustrative only, as said element may be of any desired construction suitable to its function as set forth. A spindle 26 is formed on or rigidly secured to the cross member 22 and projects laterally therefrom and a wheel 27 is suitably mounted for free rotation on said spindle, a fender 28, supported from the member 22 by means of arms 29, being suitably positioned above the said wheel to arrest mud, gravel and débris that might otherwise be thrown from said wheel when in operation. As shown in Figures 1, 2, 3, 4 and 5, the rigid portion of the strut assembly 16 is preferably housed or faired to streamline shape to reduce parasite resistance caused by said strut assembly when in extended position. The strut assembly 16 is braced against displacement longitudinally of the craft by means of a strut 30 fixed at its forward end to the cross member 20 and extending rearwardly and upwardly from said cross member in the same longitudinal, vertical plane with the assembly 16 to a hinge connection 31 with the beam 13 or some other structural element of the craft, the pintle of said hinge connection 31 being in axial alinement with the pintle 18, thus forming a rigid, V-shaped strut assembly vertically disposed in a longitudinal plane beneath the craft and free to swing transversely thereof. To position the strut assembly 16 and 30 and brace said assembly against displacement transversely of the craft, a strut 32 is pivoted at its lower end to the inner side of the cross member 20 and extends upwardly and inwardly of the craft from said connection in a vertcial plane at right angles to the vertical plane containing the V-shaped strut assembly. The upper end of the strut 32 is formed with a cylindrical head 33 axially perpendicular to said strut and projecting forwardly and rearwardly thereof, said head being received in a channel member 34 horizontally disposed transversely of and beneath the craft and secured thereto. The head 33 fits loosely within the channel 34 and is retained therein by means of opposed flanges 35 formed thereon and engaging beneath the projecting ends of said head, said flanges defining a downwardly-opening longitudinal slot in said channel through which the strut 32 extends. The channel 34 constitutes a slide bearing for the head 33, said head moving longitudinally therein as the strut assembly 16 and 30 is swung inwardly and upwardly relative to the craft, the strut 32 being accommodated by and received in the slot in the channel member during such action. A stop block 36, shaped to receive the head 33 and the upper end of the strut 32 is positioned in the channel 34 to arrest the movement of said head and strut when the assembly 16 is in vertical position, the end of said channel 34 adjacent said strut 32 being closed, as indicated at 37, and a block of resilient material 38 being interposed between said closed end and the stop block 36 to absorb the shock of impact between said head and stop block. Similar, spaced bell-cranks 39 are pivotally mounted for actuation through vertical arcs between ears 40 rising from the upper surface of the channel 34 inwardly of the closed end thereof, each of said bell-cranks being formed with a relatively wide lower arm 41 extending within the channel 34 through a slot formed in the upper surface of said channel between the ears 40, said arm 41 being formed with an arcuate end directed toward the closed end of said channel and an ear 42 projecting from the upper, outer corner of said arcuate end beyond the end of the slot through which said arm extends, it being the function of the ear 42 to engage against the upper surface of the channel 34 and limit the extension of the arm 41 within said channel at times. The bell-cranks 39 are so positioned on the channel 34 as to bring the arcuate end of the arm 41 on the outermost of said bell-cranks into engagement with the inner surface of the strut end 33 when the latter is at one limit of its range of movement and against the stop block 36, thus locking said strut end against said block and consequently locking the strut assembly 16 in vertical or landing position. The ends of the upwardly-extending arms of the bell-cranks 39 are connected by a link 43 and the outer end of said link is secured to one end of a retractile coil spring 44, the other end of said spring being secured to the beam 12 or other structural element of the craft, this arrangement resulting in the arms 41 of the bell-cranks being normally retained at the limit of their extension within the channel 34 and in locking position relative to the strut end 33. A cable 45 is secured at one end to the inner end of the link 43 and is led over and about suitable directing pulleys 46 mounted on structural elements of the craft to a connection 47 with a manually-operable plunger 48 mounted for vertical reciprocation in a slide bearing 49 secured to a bulkhead 50 or other structural element of the craft within convenient reach of the craft operator. The mechanism for operating the bell-cranks 39 by means of the cable 45 may be of any desired construction or arrangement suitable to the purpose, the arrangement illustrated contemplating the plunger 48 designed and positioned for foot operation, the cable 45 being led over a vertical pulley adjacent said plunger to the end of exerting a pull on said cable when said plunger is depressed, such a pull resulting in inward movement of the link 43 and the upper arms of the bell-cranks 39 against the tension of the spring 44 with consequent withdrawal of the arms 41 from the interior of the channel 34 and release of the strut end 33, as clearly indicated by dotted lines in Figure 8; the spring 44 normally retaining the plunger and bell-cranks in the position shown by solid lines in said figure. It is to be noted that the lower margins of the bell-crank arms 41 are inclined upwardly and inwardly so that when the strut end 33 is unlocked and sliding within the channel 34 it may freely pass beneath and lift said arms 41 on its way to locked position at the outer limit of its range of movement. A complete channel 34 with its limiting and locking elements is provided for each half of the landing gear, said channels being disposed side by side as shown in Figures 7 and 9, this arrangement permitting a more compact landing gear free from interference between the oppositely moving ends of the struts 32. Each channel 34 carries two similar, longitudinally spaced bell-cranks 39, as shown, so that, should the strut end 33 fail to be caught and locked by the bell-crank most nearly adjacent the end of the channel 34, the second or inner of said bell-cranks will function to arrest the inward movement of said strut end and retain the landing gear in extended or landing position.

An operating shaft 51, provided with one or more universal joints 52, is disposed longitudinally of the craft and substantially on the median line thereof, the rearward end of said shaft extending within easy reach of the craft operator and being suitably mounted for rotation in a bearing plate or bracket 53 secured to the bulkhead 50 or other structural element of the craft, manually-operable means such as a crank handle 54, or the like, being fixed to the end of the shaft 51 adjacent the operator's position, whereby said shaft may be rotated at times. The forward end of the shaft 51 extends through and forwardly of the beam 12 and is mounted for rotation in a bearing member 55 suitably secured to the forward surface of said beam or to other structural elements of the craft and a pinion 56 is fixed to the forward end of said shaft for rotation in a vertical plane, said pinion meshing with rack-bars 57 disposed above and below said pinion for rectilinear reciprocation transversely of the craft and retained in meshing relation with the said pinion by means of rollers 58 carried by the bearing member 55 in engaging relation with the untoothed margins of said rack-bars. Lever arms 59 are formed on and project upwardly and inwardly of the craft from the strut assemblies 16 forwardly of the beam 12 and the rack-bars 57 are extended by means of untoothed portions 60 to pivotal connection with the upper ends of said arms 59, whereby rotation of the pinion 56, causing the rack-bars 57 to move in opposite directions, is used to swing the wheeled landing gear halves simultaneously and in opposite directions. Retractile coil springs, 61, are secured at one end each to some structural element of the craft, such as the beam 12, and have their free ends attached to the arms 59, the pull of said springs being exerted in an inward direction to normally hold the landing gear halves in landing or extended position. A ratchet locking dog 62 is pivotally mounted on the beam 12 or other structural element of the craft in engagement with the teeth of the pinion 56, said dog being normally spring-held as indicated at 63 against a stop 64 to prevent rotation of said pinion in one direction and being free to ratchet past the teeth of said pinion when the said pinion is rotated to retract the landing gear, a release cable or pull wire 65 being secured to said dog and extended within reach of the craft operator for release of the locking relation between said dog and pinion when desired. Suitable fairing 66 is provided on the under surface of the craft to stream-line the parts of the landing gear when in retracted position and said fairing may be arranged to house the landing gear completely and thus minimize the resistance due to eddies of air formed by the landing gear parts when the craft is in flight. In some types of aircraft it may be expedient to form pockets in the under surfaces of the wings and fuselage to receive the landing gear parts when retracted and such construction, while not illustrated, is contemplated in certain adaptations of the invention.

In the practical operation of the invention, the landing gear halves being in extended position and the various elements disposed as shown in Figures 1, 3, 4 and 6, the strut ends 33 are locked against their respective stop blocks 36 and the craft is ready for take-off, landing or taxying, the shock of landing on rough ground being largely absorbed by the resilient elements carried by the strut assemblies 16. When the craft has attained to flight and it is desired to retract the landing gear, the plunger 48 is depressed to withdraw the bell-crank arms 41 from their locking positions within the channel 34 leaving the strut ends 33 free to slide within said channels and the crank 54 is manually-operated, rotating the shaft 51 to force the rack-bars 57 outwardly of the craft and thereby swing the landing gear halves upwardly and inwardly of the craft to the retracted position shown in Figure 2, the dog 62 holding the pinion 56 against rotation in the opposite direction and consequently retaining the landing gear halves in retracted position. When it is desired to extend the landing gear, tension is exerted on the release cable 65 and the dog 62 disengaged from the pinion 56, whereupon, under the influence of gravity and the tension of the springs 61, the landing gear halves are swung downwardly and outwardly to vertical position where they are arrested by the engagement of the strut ends 33 with their respective stop blocks 36, said strut ends being automatically locked against said stop blocks by the arms 41 of the bell-cranks 39. Should the strut ends 33 fail to travel to locking position, the dog 62 may be held out of engagement with the pinion 56 and the shaft 51 operated to force the strut assemblies and said strut ends to their proper positions.

Since many modifications of form and construction of elements are necessary in adapting the invention to aircraft of varying types and may be made without departing from the spirit of the invention, we wish to be understood as being limited in scope solely by the appended claims rather than by the details of the illustrative showing and foregoing description.

We claim as our invention—

1. A retractable landing gear for aircraft comprising independent, counterpart landing gear halves beneath and hinged for actuation through transverse vertical arcs to said aircraft, independent, counterpart means carried by said aircraft and each engageable with an element of each of said halves to lock said halves in extended position and manually-operable means carried by said aircraft and engaging elements of both said halves whereby said halves may be simultaneously moved inwardly and upwardly relative to the aircraft.

2. In a retractable landing gear for aircraft having independent, counterpart halves beneath and hinged for actuation through transverse vertical arcs to said aircraft and brace members extending rearwardly and upwardly from said halves longitudinally of said aircraft to a hinge connection therewith, means for bracing said halves laterally of said aircraft, said means comprising brace struts hinged at their lower ends to inner portions of said halves and extending upwardly and inwardly in converging relation therefrom, each of said brace struts being formed with a T-head on its inner, upper end, said T-heads being slidingly received in parallel, adjacent channel members horizontally disposed transversely of the lower surface of said aircraft, stops in said channel members for limiting movement of said T-heads therein in one direction and automatic locking means carried by said channels adjacent said stops whereby said T-heads may be locked against said stops; together with manually-operable means for releasing said locking means.

3. In a retractable landing gear for aircraft having independent, counterpart halves beneath and hinged for actuation through transverse vertical arcs to said aircraft, brace members extending rearwardly and upwardly from said halves longitudinally of said aircraft to a hinge connection therewith and brace members hinged to said halves and extending inwardly and upwardly therefrom to a sliding connection with said aircraft, means for locking the sliding connection of said latter brace members in a predetermined position, said means comprising a T-head on the inner, upper end of each of said latter brace members, parallel, adjacent channel members horizontally disposed transversely of the under portion of said aircraft in position to slidingly receive said T-heads, stop blocks positioned in said channel members to arrest the movement of said T-heads therein when said halves are in substantially vertical position and bell-cranks pivotally carried by and arranged in spaced pairs on each of said channels inwardly of said stop blocks, the upper arms of each pair of bell-cranks being link-connected and the lower arms of said bell-cranks extending within said channel and directed toward said stop blocks; together with manually-operable means engaging the linked ends of said bell-cranks whereby the lower arms thereof may be withdrawn from said channels at times.

4. In a retractable landing gear for aircraft having independent, counterpart landing gear halves beneath and hinged for actuation through transverse vertical arcs to said aircraft and means for rigidly bracing said halves longitudinally of and to said aircraft and selectively bracing said halves transversely of and to said aircraft, means for moving said halves inwardly and upwardly of said aircraft, said means comprising upwardly and inwardly extending lever arms on and extending above said halves, a manually-operable pinion mounted for rotation on said aircraft between said arms, rack-bars in meshing relation with and on opposite sides of said pinion and pivotally connected with said lever arms, a ratchet dog normally spring held in engaging position with said pinion to limit rotation thereof in one direction and manually-operable means for releasing said ratchet dog at times.

5. In a retractable landing gear for aircraft having independent, counterpart halves beneath and hinged for actuation through transverse vertical arcs to said aircraft, means for rigidly bracing said halves longitudinally of said aircraft, means including brace members hinged at one end each to said halves and formed with T-heads slidingly received in channel members carried by said aircraft for selectively bracing said halves transversely of said aircraft, stop and locking means carried by said channel members for automatically locking the sliding ends of said brace members in predetermined position in said channels, manually-operable means for releasing said locking means at times and further manually-operable means, including a rotatable pinion, rack-bars in meshing relation with said pinion and pivotal engagement with lever arms of said halves, whereby said halves may be moved through vertical arcs transversely of said aircraft.

Signed at Colorado Springs, in the county of El Paso and State of Colorado, this 23rd day of January, 1929.

ALBERT W. MOONEY.
LEWIS H. HEIGHT.